(12) United States Patent
Batta et al.

(10) Patent No.: US 11,010,376 B2
(45) Date of Patent: May 18, 2021

(54) METHODS AND SYSTEMS FOR DETERMINING SEARCH PARAMETERS FROM A SEARCH QUERY

(71) Applicant: Verizon Patent and Licensing Inc., Arlington, VA (US)

(72) Inventors: Andrew Batta, Broomfield, CO (US); John Coster, Denver, CO (US); Jonathan Harahush, Golden, CO (US); Chad Kearney, Denver, CO (US); Bryan Jeffrey Kobler, Denver, CO (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 221 days.

(21) Appl. No.: 16/166,082

(22) Filed: Oct. 20, 2018

(65) Prior Publication Data

US 2020/0125663 A1   Apr. 23, 2020

(51) Int. Cl.
*G06F 16/2453* (2019.01)
*G06N 3/08* (2006.01)
*G06F 7/14* (2006.01)
*G06F 16/248* (2019.01)

(52) U.S. Cl.
CPC .......... *G06F 16/24534* (2019.01); *G06F 7/14* (2013.01); *G06F 16/248* (2019.01); *G06N 3/08* (2013.01)

(58) Field of Classification Search
USPC ................................................ 707/708, 713
See application file for complete search history.

(56) References Cited

U.S. PATENT DOCUMENTS

| | | | | |
|---|---|---|---|---|
| 7,984,039 B2* | 7/2011 | Carmel | ................. | G06F 16/951 707/713 |
| 8,650,186 B2* | 2/2014 | Beck | .................... | G06Q 10/087 707/723 |
| 8,732,155 B2* | 5/2014 | Vegnaduzzo | ......... | G06F 16/951 707/708 |
| 8,745,065 B2* | 6/2014 | Wang | ...................... | G06F 16/00 707/748 |
| 8,868,567 B2* | 10/2014 | Kumar | .............. | G06F 16/24578 707/748 |
| 9,619,555 B2* | 4/2017 | Anwar | ..................... | G06F 16/36 |
| 10,176,168 B2* | 1/2019 | Gao | ........................ | G06F 40/232 |
| 10,452,652 B2* | 10/2019 | Hernandez Sanchez | ..................... | G06F 16/22 |
| 2003/0217052 A1* | 11/2003 | Rubenczyk | ........... | G06F 16/951 |

(Continued)

*Primary Examiner* — Cam Linh T Nguyen

(57) ABSTRACT

An exemplary query parsing system accesses user input text representative of a search query. The system generates a plurality of candidate parses of the user input text. Each of the plurality of candidate parses includes a candidate what portion and a candidate where portion determined from the user input text. The system generates a score for each candidate parse in the plurality of candidate parses based on whether one or more of a plurality of predefined parsing features are found in the respective candidate parse and on a machine learning mode. The system selects, from the plurality of candidate parses based on the scores for the plurality of candidate parses, the candidate what portion and the candidate where portion of a particular candidate parse included in the plurality of candidate parses as search parameters for the search query. Corresponding methods and systems are also disclosed.

21 Claims, 8 Drawing Sheets

400

| Candidate Parse | Candidate What Portion | Candidate Where Portion |
|---|---|---|
| CP 414-1 | Pizza 416-1 | Dallas 418-1 |
| CP 414-2 | Dallas 416-2 | Pizza 418-2 |
| CP 414-3 | 416-3 | Dallas Pizza 418-3 |
| CP 414-4 | Dallas Pizza 416-4 | 418-4 |

(56) References Cited

U.S. PATENT DOCUMENTS

| | | | | |
|---|---|---|---|---|
| 2005/0222975 | A1* | 10/2005 | Nayak | G06F 16/338 |
| 2005/0273396 | A1* | 12/2005 | Aliabadi | G06Q 30/0633 |
| | | | | 705/26.1 |
| 2009/0132512 | A1* | 5/2009 | Kislyuk | G06F 16/951 |
| 2010/0306188 | A1* | 12/2010 | Cunningham | G06F 16/24542 |
| | | | | 707/713 |
| 2011/0282864 | A1* | 11/2011 | Collins | G06F 16/24534 |
| | | | | 707/719 |
| 2012/0072412 | A1* | 3/2012 | Bestgen | G06F 16/24549 |
| | | | | 707/714 |
| 2012/0290559 | A1* | 11/2012 | Fuller | G06F 16/2456 |
| | | | | 707/714 |
| 2014/0095472 | A1* | 4/2014 | Lee | G06F 16/24542 |
| | | | | 707/714 |
| 2016/0078101 | A1* | 3/2016 | Somaiya | G06F 16/3322 |
| | | | | 707/706 |
| 2018/0349377 | A1* | 12/2018 | Verma | G06F 16/248 |
| 2019/0228082 | A1* | 7/2019 | Batta | G10L 15/1822 |

\* cited by examiner

| Candidate Parse | Candidate What Portion | Candidate Where Portion |
|---|---|---|
| CP 414-1 | Pizza 416-1 | Dallas 418-1 |
| CP 414-2 | Dallas 416-2 | Pizza 418-2 |
| CP 414-3 | 416-3 | Dallas Pizza 418-3 |
| CP 414-4 | Dallas Pizza 416-4 | 418-4 |

Fig. 4

METHODS AND SYSTEMS FOR DETERMINING SEARCH PARAMETERS FROM A SEARCH QUERY

BACKGROUND INFORMATION

A computer-implemented mapping service may search a data store, such as a points-of-interest data store, based on user input text representative of a search query and provide results of the search to a user of the service. The results of the search are dependent, at least in part, on the accuracy with which the user input text is parsed into search parameters that are used to search the data store.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIG. 4 shows an exemplary table illustrating candidate parses of user input text according to principles described herein.

DETAILED DESCRIPTION OF PREFERRED EMBODIMENTS

Methods and systems for determining search parameters from a search query are described herein. In certain examples, a query parsing system may access user input text representative of a search query and generate multiple candidate parses of the user input text. Each candidate parse may include a candidate what portion representing a point-of-interest and a candidate where portion representing a location to search for the point-of-interest. The query parsing system may generate a score for each candidate parse based on whether one or more of a plurality of predefined parsing features are found in the respective candidate parse. The query parsing system may select, from the candidate parses based on the scores for the candidate parses, a candidate parse to use for the search query. The selection of the candidate parse may include a selection of the candidate what portion and the candidate where portion of the candidate parse as search parameters for the search query. The selected candidate what portion and candidate where portion may then be used as search parameters to search a points-of-interest data store.

Methods and systems described herein for determining search parameters from a search query may provide various benefits, which may include one or more advantages over search query parsing technologies used in conventional computer-implemented mapping services. For example, by generating a score for each candidate parse of user input text representative of a search query based on whether one or more of a plurality of predefined parsing features are found in the respective candidate parse and selecting, from the candidate parses based on the scores for the candidate parses, a candidate parse to use for the search query, systems and methods described herein may select a correct and/or preferred candidate parse with improved accuracy compared to search query parsing technologies used in conventional computer-implemented mapping services. In certain examples, systems and methods described herein may generate, score, and consider a complete set of candidate parses for user input text representative of a search query in order to select a candidate parse to use for the search query. This way of selecting a candidate parse may provide improved accuracy compared to conventional search query parsing technologies that may stop considering potential parses once an adequately matching parse is found.

Various embodiments will now be described in more detail with reference to the figures. The disclosed systems and methods may provide one or more of the benefits mentioned above and/or various additional and/or alternative benefits that will be made apparent herein.

Figure 1:
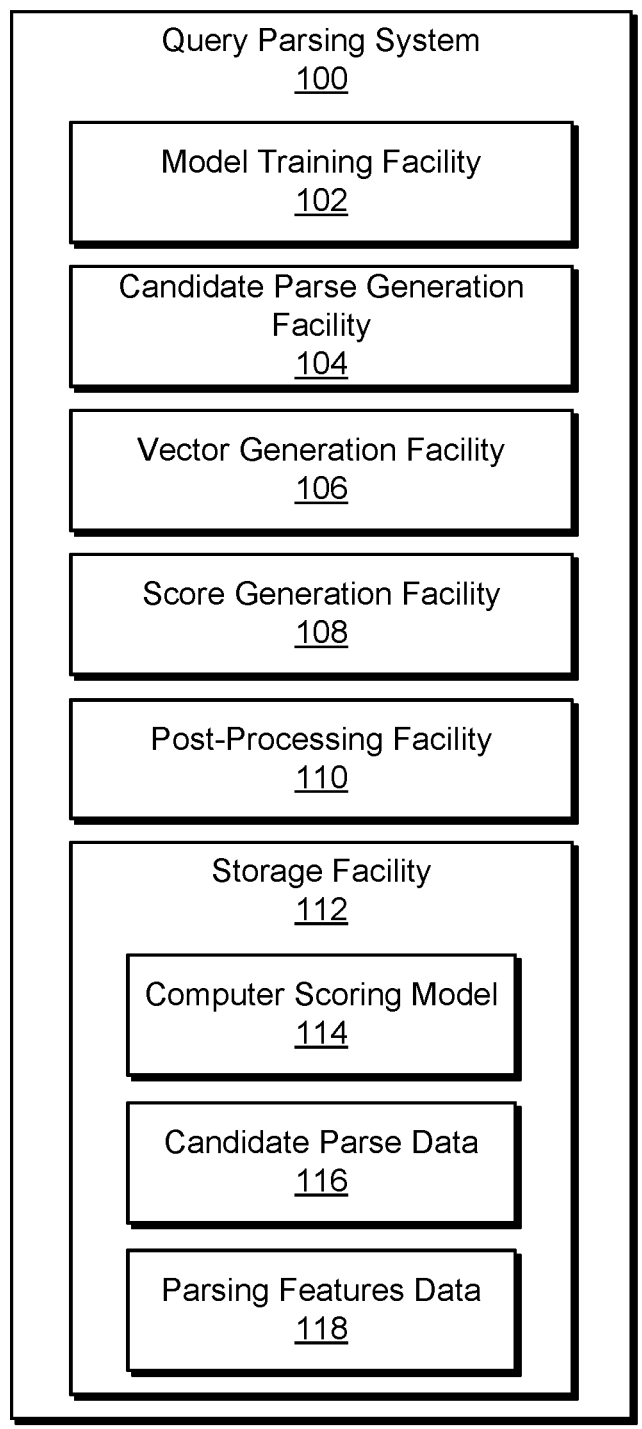
FIG. 1 illustrates an exemplary query parsing system according to principles described herein.

FIG. 1 illustrates an exemplary query parsing system 100 ("system 100") configured to determine search parameters from a search query. As shown, system 100 may include, without limitation, a model training facility 102, a candidate parse generation facility 104, a vector generation facility 106, a score generation facility 108, a post-processing facility 110, and a storage facility 112 selectively and communicatively coupled to one another. It will be recognized that although facilities 102 through 112 are shown to be separate facilities in FIG. 1, facilities 102 through 112 may be combined into fewer facilities, such as into a single facility, or divided into more facilities as may serve a particular implementation. In some examples, facilities 102 through 112 may be distributed between multiple devices and/or multiple locations as may serve a particular implementation. Additionally, one or more of facilities 102 through 112 may be omitted from system 100 in certain implementations, while additional facilities may be included within system 100 in the same or other implementations.

Each of facilities 102 through 112 may include or be implemented by computing hardware and/or software components (e.g., processors, memories, communication interfaces, instructions stored in memory for execution by the processors, etc.). The facilities may be implemented using separate computing components unique to each facility, or may be implemented using shared computing components.

The facilities of system 100 may perform one or more of the operations described herein to determine search parameters from a search query. For example, system 100 may access user input text representative of a search query, generate multiple candidate parses of the user input text, generate a score for each candidate parse based on whether one or more of a plurality of predefined parsing features are found in the respective candidate parse, and select, from the candidate parses based on the scores for the candidate parses, a candidate parse to use for the search query.

In certain examples, system 100 may implement and use a machine learning model to generate scores for candidate parses based on whether one or more of a plurality of predefined parsing features are found in the respective candidate parse. For example, for a candidate parse, system 100 may determine whether one or more of a plurality of predefined parsing features are found in the candidate parse. Based on the determination, system 100 may generate a data structure such as a vector for the candidate parse. The vector may be generated to include values indicative of whether predefined parsing features are found in the candidate parse. System 100 may provide the vector as input to a machine learning model, such as a trained computer scoring model, which may be executed by system 100 to generate, based on the vector, a score for the candidate parse. System 100 may perform these operations for each candidate parse of user input text representative of a search query such that a score is generated for each candidate parse. System 100 may select, from the candidate parses of the user input text and based on the scores of the candidate parses, one or more of the candidate parses to be used for the search query. For example, the candidate what portion and candidate where portion of a selected candidate parse may be used as search parameters for the search query.

Each of the facilities of system 100 and exemplary operations that may be performed by the facilities of system 100 to determine search parameters from a search query will now be described in more detail.

Storage facility 112 may store and maintain any data received, generated, managed, used, and/or transmitted by facilities 102 through 110 as may serve a particular implementation. In some examples, for instance, storage facility 112 may include data representative of a computer scoring model 114, candidate parse data 116, and parsing features data 118.

Computer scoring model 114 may include any type or implementation of a machine learning computer scoring model for scoring candidate parses of user input text representative of a search query. For instance, the computer scoring model may include a neural network having an input layer, any suitable number of hidden layers, and an output layer. The neural network may be a convolutional neural network, a residual convolutional neural network, or any other suitable neural network. In other implementations, computer scoring model 114 may include any other suitable machine learning model configured or configurable to score candidate parses of user input text representative of a search query.

Candidate parse data 116 may include any data representing and/or otherwise associated with candidate parses of user input text representative of a search query. For example, candidate parse data 116 may represent candidate parses, data structures such as vectors that are generated for candidate parses, and/or scores that are generated for candidate parses. Examples of such data are described herein.

Parsing features data 118 may include data representing a set of defined parsing features on which scoring of candidate parses may be based. Parsing features data 118 may represent the parsing features and rules indicating how to use the parsing features to evaluate candidate parses. In certain examples, the parsing features may be used by system 100 to evaluate candidate parses and to generate vectors that represent the evaluations of the candidate parses. Examples of parsing features and ways that parsing features may be used by system 100 to score candidate parses are described herein.

Model training facility 102 may be configured to train a computer scoring model, such as computer scoring model 114, to score candidate parses of user input text representative of a search query. For example, model training facility 102 may execute one or more training sessions, of a training phase, to train a computer scoring model capable of machine learning. A training session may be performed in any suitable way. For example, model training facility 102 may submit one or more sets of training data representing test candidate parses of a test search query to the computer scoring model for supervised machine learning by the computer scoring model, such that the computer scoring model learns to generate a score for a candidate parse. In certain examples, model training facility 102 may submit as training data, to the computer scoring model, a set of test vectors for test candidate parses and an identification of a correct test candidate parse. The computer scoring model may use the set of test vectors and the identification of the correct test candidate parse to learn how to weigh values in a vector to generate a highest score (as compared to scores for the other test candidate parses in the training dataset) for the identified correct test candidate parse.

Model training facility 102 may be configured to train a machine learning computer scoring model in any suitable way. For example, model training facility 102 may train the computer scoring model starting from scratch using test candidate parses (e.g., test vectors generated from the test candidate parses) and a user selected correct test candidate parse, and/or may further train the computer scoring model using additional training datasets for test search queries. An example of model training facility 102 training a computer scoring model is described in more detail herein.

Candidate parse generation facility 104 may be configured to create multiple candidate parses of user input text representative of a search query. Candidate parse generation facility 104 may perform any suitable operations to generate candidate parses of the user input text. In certain examples, candidate parse generation facility 104 may be configured to generate, from user input text representative of a search query, a set of candidate parses that each include a candidate what portion and a candidate where portion. The candidate what portion may be populated with data that represents a candidate subject of a search query, such as a candidate point-of-interest to be searched. The candidate where portion may be populated with data that represents a candidate location for the search query, such as a candidate geographic location to search for the candidate point-of-interest. A set of candidate parses of a search query may include candidate parses having different values and/or combinations of candidate what portions and candidate where portions.

To generate candidate parses, candidate parse generation facility 104 may identify tokens included within user input text representative of a search query. In an example, a token may be an alphanumeric string of characters, and separate tokens in the user input text may be identified by any suitable means, such as the tokens being separated by a white space (e.g., a space character) in the user input text. Candidate parse generation facility 104 may generate different arrangements of the tokens into a candidate what portion and a candidate where portion to generate a set of potential candidate parses for the user input text. The arrangement of the tokens may include assigning any number of tokens (including zero tokens) to a candidate what portion and a candidate where portion. Tokens assigned to a candidate what portion may represent a candidate subject of the search query, such as a candidate point-of-interest to be searched. Tokens assigned to a candidate where portion may represent a candidate location for the search query, such as a candidate geographic location to be searched for the candidate point-of-interest.

For example, if user input text includes two tokens, candidate parse generation facility 104 may generate four candidate parses that may include: a first candidate parse that includes a candidate what portion containing both tokens and a candidate where portion containing a null value; a second candidate parse that includes a candidate what portion containing the first token and a candidate where portion containing the second token; a third candidate parse that includes a candidate what portion containing the second token and a candidate where portion containing the first token; and a fourth candidate parse that includes a candidate what portion containing a null value and a candidate where portion containing both tokens. In certain examples, the null value in a candidate what portion or a candidate where portion indicates that although the portion is created, no token is assigned to that portion.

Vector generation facility 106 may be configured to generate any suitable data to represent whether one or more parsing features are found in a candidate parse of a search query. In certain examples, vector generation facility 106 may be configured to generate a distinct vector for each candidate parse for a search query in any suitable way. Such a vector may include a set of values that are assigned by vector generation facility 106 based on whether a set of predefined parsing features are found in a candidate parse of a search query. To illustrate, vector generation facility 106 may evaluate multiple parsing features with respect to a candidate parse and assign various values in a vector to represent evaluation results for the parsing features. Examples of such values may include, but are not limited to, a representation of an importance of a token in the candidate parse and a representation of whether a particular parsing feature is found in the associated candidate parse.

In certain examples, for a candidate parse of a search query, vector generation facility 106 may create an instance of a vector data structure and assign values to the vector data structure (e.g., to fields of the vector data structure) based on evaluations that determine whether parsing features are found in the candidate parse. While any suitable values may be assigned, in certain implementations, values of 0 or 1 and/or values between 0 and 1 may be assigned to a vector. In an example, if an evaluation of a parsing feature relative to the candidate parse (e.g., a determination of whether the parsing feature is found in the candidate parse) results in a true/false or yes/no determination, vector generation facility 106 may assign a value of 0 or 1 to a field associated with the parsing feature. Otherwise, based on an evaluation of a parsing feature, vector generation facility 106 may assign any value between 0 and 1 to a field associated with the parsing feature.

Additionally or alternatively, vector generation facility 106 may be configured to assign a value based on a 'whatness' attribute of a token in the candidate parse. In an example, a 'whatness' attribute may include any attribute indicative of a likelihood that the token is a 'what' token rather than a 'where' token. Thus, a token typically found in a point-of-interest name (e.g., a business name) will have a higher 'whatness' value compared to a token typically found in a location to search (e.g., an address number, a city name, or a state name).

Additionally or alternatively, vector generation facility 106 may be configured to assign a value based on a 'whereness' attribute of a token in the candidate parse. In an example, a 'whereness' attribute may include any attribute indicative of a likelihood that the token is a 'where' token rather than a 'what' token. Thus, a token typically found in a location to search (e.g., an address number, a city name, or a state name) will have a higher 'whereness' value compared to a token typically found in a point-of-interest name (e.g., a business name).

Score generation facility 108 may be configured to execute a runtime operation of a computer scoring model, such as computer scoring model 114, to generate scores for candidate parses of user input text representative of a search query. For example, score generation facility 108 may submit a dataset for candidate parses to the computer scoring model, which may use the dataset to generate scores for the candidate parses.

The computer scoring model may generate the scores in any suitable way, using any suitable dataset for the candidate parses as input to the computer scoring model. For example, a dataset for the candidate parses submitted to the computer scoring model may include a set of distinct vectors for the candidate parses. The vectors include values generated, by a pre-processing operation, based on whether various defined parsing features have been found in the candidate parses, as described herein. In other examples, the input to the computer scoring model may be in other suitable forms, such as data representative of the candidate parses.

The computer scoring model may output scores for the candidate parses. The output for a candidate parse may be in any suitable form, including a value between 0 and 1 that indicates a likelihood that the candidate parse is a correct or preferred parse of a search query.

Post-processing facility 110 may be configured to perform one or more operations on the outputs of a computer scoring model in order to select search parameters of a search query. For example, post-processing facility 110 may select a candidate what portion and a candidate where portion of a particular candidate parse based on scores for candidate parses of a search query. In some examples, post-processing facility 110 may rank scores for the candidate parses and select a candidate parse from the ranked scores. For example, post-processing facility 110 may select, as search parameters, a candidate what portion and a candidate where portion for a highest-ranked candidate parse. As another example, in certain implementations, post-processing facility 110 may select, as search parameters, candidate what portions and candidate where portions of multiple candidate parses based on the scores of the candidate parses (e.g., the top two highest-ranked candidate parses).

Selected search parameters may be used for a search query. For example, selected search parameters may be used to search one or more data stores, such as a points-of-interest data store to generate search results for the search query.

Exemplary features of system 100 and/or operations that may be performed by system 100 will now be described in more detail.

Figure 2:
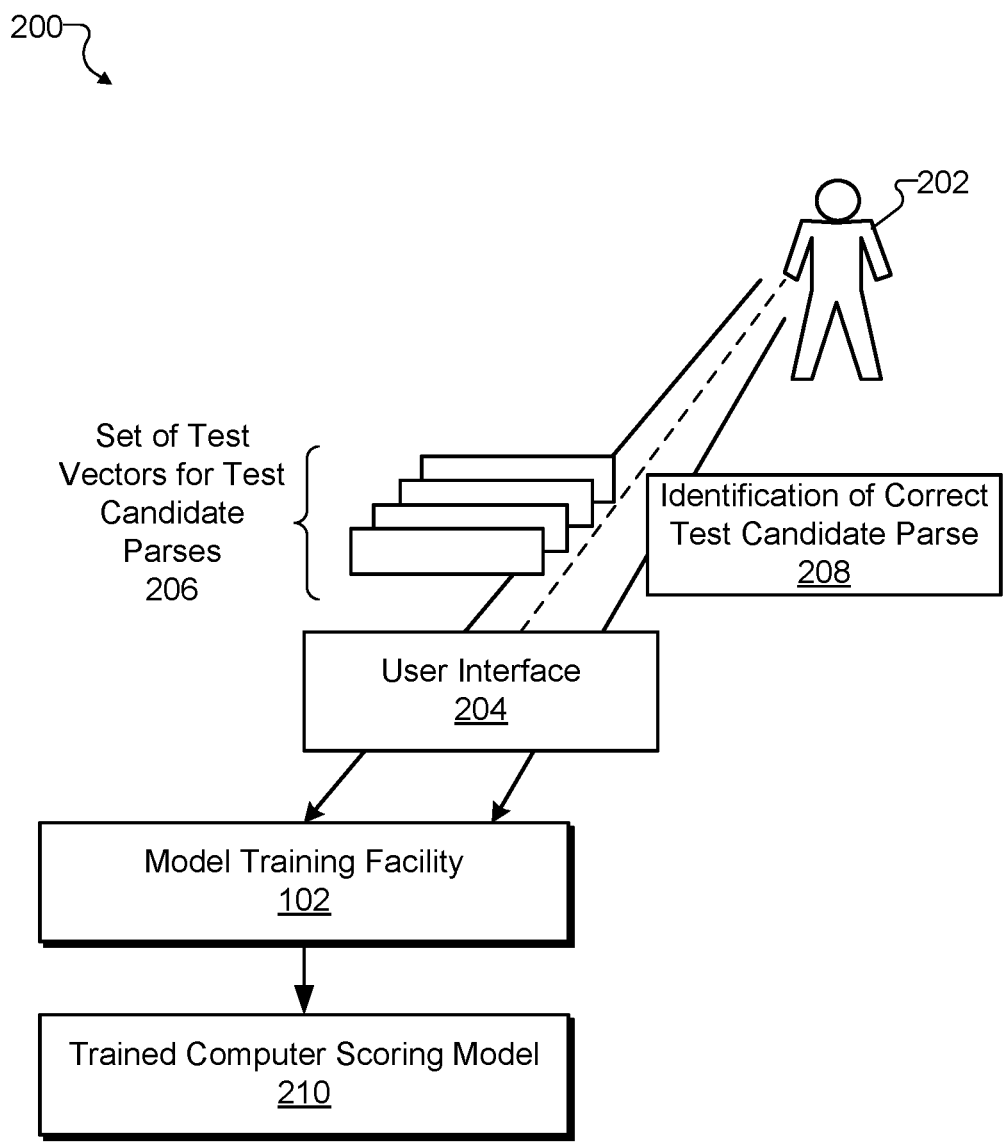
FIG. 2 illustrates an exemplary configuration for training a computer scoring model according to principles described herein.

FIG. 2 illustrates an exemplary configuration 200 for training a computer scoring model. As shown, a user 202 may provide, via a user interface 204, a training dataset to model training facility 102, which may utilize the training dataset to train a computer scoring model, such as computer scoring model 114 of FIG. 1, in any suitable manner. Specifically, model training facility 102 may use a training dataset to train a computer scoring model to score candidate parses of user input text based on parsing features.

In one example, a training dataset may include any suitable data representative of test candidate parses for test user input text of a test search query. For example, the training dataset may include a set 206 of distinct test vectors for test candidate parses, and each test vector of set 206 may represent whether one or more parsing features are found in a corresponding test candidate parse as described herein. The training dataset may also include an identification 208 of a correct test candidate parse included in the test candidate parses.

In certain examples, prior to user 202 providing the training dataset to user interface 204, test candidate parses of a test search query may be created in any suitable manner. For example, by arranging tokens of test user input text in different groupings, user 202 may generate multiple candidate parses including various combinations of tokens as test what portions and test where portions. To this end, each test candidate parse, created by user 202, may include a different arrangement of tokens in its respective test what portion and test where portion. In a similar but alternative manner, candidate parse generation facility 104 of FIG. 1 may create the test candidate parses from user input text.

In some examples, the set 206 of distinct test vectors may be generated in any suitable manner, including user 202 creating the set 206 of distinct test vectors based on defined parsing features. To illustrate, for a test candidate parse, user 202 may evaluate defined parsing features with respect to the test candidate parse. Based on the evaluations, user 202 may assign values to a test vector, which values represent evaluation results for the parsing features (e.g., whether the parsing features are found within the test candidate parse). This process may be performed, by user 202, for each test candidate parse until the set 206 of test vectors includes a distinct test vector for each of the test candidate parses. In a similar but alternative manner, vector generation facility 106 may generate, from a set of test candidate parses, the set 206 of distinct test vectors for the training dataset.

During a training phase, model training facility 102 may execute one or more sessions to facilitate training of a computer scoring model based on a training dataset. In some examples, model training facility 102 may access and use the set 206 of distinct test vectors and identification 208 of the correct test candidate parse for training the computer scoring model to score the test candidate parses in any suitable way. For example, during the training phase, model training facility 102 may perform operations to facilitate learning by a computer scoring model, using any suitable machine learning technologies, how to weigh values within each distinct test vector of the set 206, such that the test candidate parse of identification 208 receives a highest score of all test candidate parses in the training dataset.

In some examples, a level of difficulty to properly score candidate parses may vary between training datasets. In one example, during one training session, model training facility 102 may receive a training dataset for test candidate parses that are easily scored so that the test candidate parse of identification 208 receives the highest score. In a different iteration of the training sessions, a training dataset may include candidate parses that are difficult to properly score (e.g., edge cases). However, in both of the training sessions above, model training facility 102 may utilize identification 208 to facilitate learning, by the computer scoring model, how to properly score the distinct vectors of the set 206 so that the test candidate parse of identification 208 receives the highest score. Thus, model training facility 102 may utilize training datasets with various levels of difficultly to train a computer scoring model.

Completion of a training phase, by model training facility 102, results in a trained computer scoring model 210 that is configured to generate scores for candidate parses of user input text representative of a search query. In one example, the trained computer scoring model 210 may be stored in a data store, such as storage facility 112, and may be executed during runtime by any suitable computing component, including score generation facility 108, to score candidate parses of user input text representative of a search query.

Figure 3:
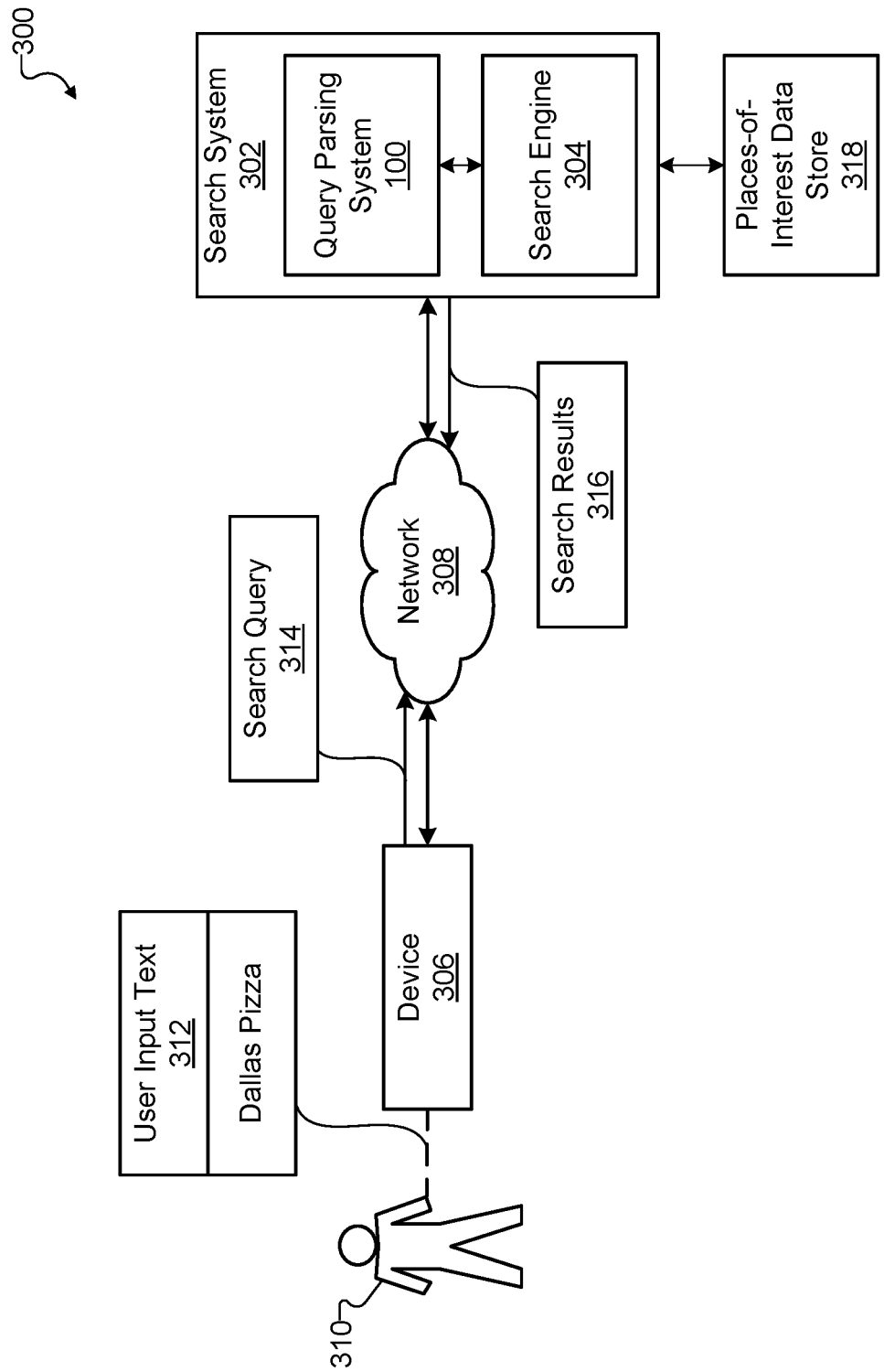
FIG. 3 illustrates an exemplary configuration for determining search parameters from a search query and performing a search according to principles described herein.

FIG. 3 illustrates an exemplary configuration 300 in which a search system 302 may operate to determine search parameters from a search query and to perform a search based on the search parameters. For example, as shown, search system 302 includes query parsing system 100 to determine search parameters from a search query, as described herein, and a search engine 304 to perform a search based on the search parameters determined by query parsing system 100. As shown, search system 302 may be communicatively coupled with a computing device 306 ("device 306") by way of a network 308. Search system 302 and device 306 may communicate one with another by way of network 308.

Network 308 may include a wireless local area network (e.g., a Wi-Fi network), a provider-specific wired or wireless network (e.g., a cable or satellite carrier network, a mobile telephone network, etc.), the Internet, a wide area network, a content delivery network, and/or any other suitable network or networks. Accordingly, data may flow between search system 302 and device 306 by way of network 308 using any communication technologies, devices, media, and protocols as may serve a particular implementation.

Device 306 may be implemented as any suitable computing device able to be operated by a user 310 to provide user input text 312 as a search query 314 from device 306 to search system 302 via network 308. For example, device 306 may be a mobile phone (e.g., a smartphone), a tablet device, a laptop computer, a personal computer, a wearable computing device, a navigational device, or the like configured to receive user input text 312 representative of search query 314 from user 310 and to transmit data representative of search query 314 to search system 302 by way of network 308.

In some examples, user input text 312 may include any suitable data to represent a desired search query, such as search query 314. For example, user input text 312 may include any suitable number of tokens that represent a point-of-interest as a search subject and/or any other suitable number of tokens that represent a search location (e.g., a location at which to perform a search for the point-of-interest).

As shown in FIG. 3, user input text 312 may include exemplary tokens 'Dallas' and 'Pizza' representative of search query 314. One or more exemplary operations of search system 302 will be described with respect to the exemplary tokens 'Dallas' and 'Pizza' as user input text 312.

Query parsing system 100, implemented by search system 302 in configuration 300, may determine search parameters for search query 314 in any suitable way. For example, query parsing system 100 may determine search parameters by performing one or more operations including, but not limited to, accessing user input text 312 representative of search query 314, generating multiple candidate parses of user input text 312, generating a distinct vector for each candidate parse, scoring the candidate parses based on the distinct vectors for the candidate parses, and selecting, as search parameters, a candidate what portion and a candidate where portion of a particular candidate parse based on the scores for the candidate parses.

Query parsing system 100 may access user input text 312 in any suitable manner. For example, query parsing system 100 may access user input text 312 by receiving user input text 312 from device 306 and utilizing user input test 312 during the one or more operations to determine search parameters.

In one example, upon accessing user input text 312, query parsing system 100 may perform one or more operations to generate candidate parses of user input text 312. In some examples, query parsing system 100 may first identify each of the tokens in user input text 312 in any suitable way, including, but not limited to, a detection of a white space or other characters separating the tokens in user input text 312. Based on the identified tokens, query parsing system 100 may generate any suitable number of candidate parses for user input text 312 as will be described with reference to FIG. 4.

FIG. 4 shows an exemplary table 400 illustrating candidate parses 414 (e.g., candidate parse 414-1, candidate parse 414-2, candidate parse 414-3, and candidate parse 414-4) of user input text 312. As mentioned above, each candidate parse 414 includes a candidate what portion 416 (e.g., candidate what portion 416-1 of candidate parse 414-1, candidate what portion 416-2 of candidate parse 414-2, candidate what portion 416-3 of candidate parse 414-3, and candidate what portion 416-4 of candidate parse 414-4) and a candidate where portion 416 (e.g., candidate where portion 418-1 of candidate parse 414-1, candidate where portion 418-2 of candidate parse 414-2, candidate where portion 418-3 of candidate parse 414-3, and candidate where portion 418-4 of candidate parse 414-4).

Continuing with 'Dallas Pizza' as an exemplary user input text 312, query parsing system 100 may arrange the tokens 'Dallas' and 'Pizza' in different combinations to generate candidate what portions 416 and candidate where portions 418 of candidate parses 414. As shown, examples of candidate what portions 416 and candidate where portions 418 of candidate parses 414 include: candidate what portion 416-1 including 'Pizza' and candidate where portion 418-1 including 'Dallas' in candidate parse 414-1; candidate what portion 416-2 including 'Dallas' and candidate where portion 418-2 including 'Pizza' in candidate parse 414-2; candidate what portion 416-3 including a null value and candidate where portion 418-3 including 'Dallas Pizza' in candidate parse 414-3; and candidate what portion 416-4 including 'Dallas Pizza' and candidate where portion 418-4 including a null value in candidate parse 414-4.

Returning to FIG. 3, query parsing system 100 may perform one or more operations to generate a distinct vector for each of the candidate parses 414. For example, query parsing system 100 may evaluate various parsing features, such as predefined parsing features represented by parsing features data 118, with respect to each of the candidate parses 414, and generate a distinct vector for each of the candidate parses 414 based on the evaluations. In one example, a distinct vector may include multiple values, and each value may represent an evaluation result of a different parsing feature with respect to a candidate parse as described herein.

An evaluation of a parsing feature relative to a candidate parse may be based on any suitable criteria including, but not limited to, whether a parsing feature is found in the candidate parse, an importance level of a token found in the candidate parse, a 'whatness' attribute of a token found in the candidate parse, a 'whereness' attribute of a token found in the candidate parse, or any combination of such criteria. To facilitate evaluation of parsing features relative to a candidate parse, a set of parsing features may be defined in advance of receipt of a search query such that the parsing features are ready to be used by system 100 to evaluate a candidate parse and generate a vector for the candidate parse. Examples of parsing features (that may be evaluated with respect to a candidate parse as described herein) may include, but are not limited to, a candidate what portion is an exact point-of-interest, a candidate parse solely includes a candidate what portion, a candidate parse solely includes a candidate where portion, a candidate where portion is an exact city and not an exact state, a candidate where portion is an exact state, a candidate what portion precedes a candidate where portion in user input text, and a weight (e.g., an importance level) of a city in a candidate where portion when there is no exact state. For purpose of describing certain examples herein, these examples of parsing features may be defined to be a set of parsing features used to generate a vector for a candidate parse. However, additional and/or alternative parsing features (e.g., a candidate what portion ending with a comma, a candidate where portion being an exact country, etc.) may be included in a defined set of parsing features in other examples. Accordingly, a set of defined parsing features may be defined as may suit a particular implementation.

As mentioned above, based on the evaluation of the parsing features relative to a candidate parse 414, one or more values in a distinct vector may be assigned values of 0 or 1 and/or values between 0 and 1. In an example, if the evaluation of a parsing feature results in a true/false or yes/no determination, then a value associated with the parsing feature will be assigned either 0 or 1. Otherwise, based on the evaluation of the parsing feature, any value between 0 and 1 may be assigned.

In certain examples, a vector may include any suitable number of values, such as the same number as the number of parsing features evaluated (e.g., each value may represent a result of an evaluation of a corresponding parsing feature). Additionally, the values in a vector may be in any suitable order. In certain examples, each distinct vector in a set of distinct vectors associated with a set of candidate parses includes a same number and arrangement of value fields such that a value for a particular parsing feature is located at the same position in each of the distinct vectors.

An example of query parsing system 100 generating a vector for a candidate parse will now be described. Continuing with 'Dallas Pizza' as an exemplary user input text 312 and with exemplary candidate parse 414-1 having candidate what portion 416-1 including 'Pizza' and candidate where portion 418-1 including 'Dallas', query parsing system 100 may generate a vector for candidate parse 414-1 with respect to a set of defined parsing features.

Based on the exemplary set of defined parsing features described above, for example, query parsing system 100 may assign a value of '0' in a first position of the vector based on parsing feature 'candidate what portion is exact point-of-interest' not being true because 'Pizza' does not represent an exact point-of-interest. Query parsing system 100 may evaluate all parsing features with respect to candidate parse 414-1 in a similar manner, until values for all parsing features are assigned to a vector. For example, a generated vector (e.g., vector 506-1 in FIG. 5) for candidate parse 414-1 may be '0,0,0,1,0,1,0.8, . . . ' based on the evaluation of the above parsing features (and any other suitable parsing features) with respect to candidate parse 414-1.

Figure 5:
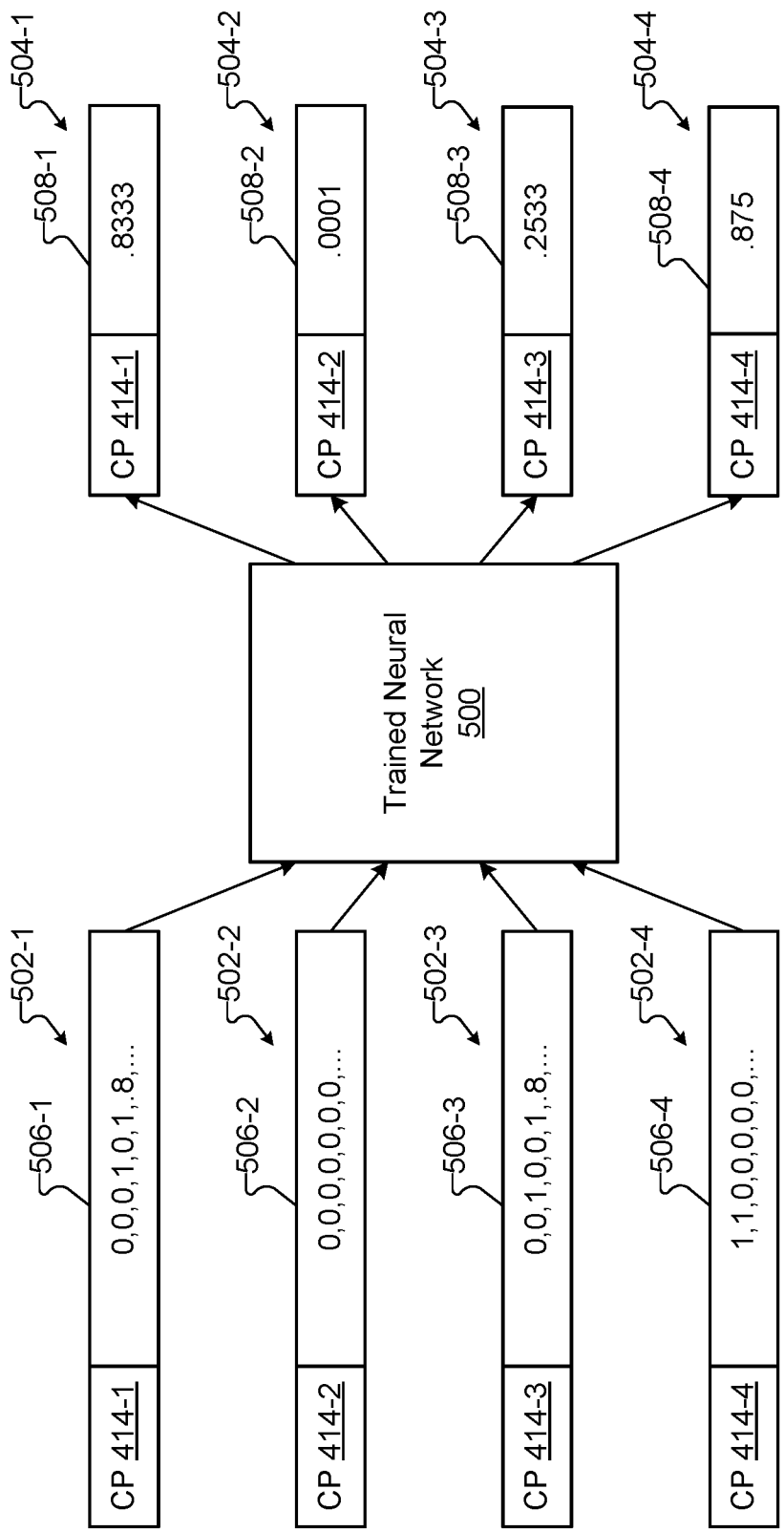
FIG. 5 illustrates exemplary inputs and outputs of a trained neural network according to principles described herein.

Query parsing system 100 may evaluate, in a similar manner, the parsing features with respect to candidate parses 414-2, 414-3, and 414-4 to generate respective vectors 506-2, 506-3, and 506-4 as shown in FIG. 5. In certain examples, the distinct vectors 506-1, 506-2, 506-3, and 506-4 for candidate parses 414-1, 414-2, 414-3, and 414-4 may be utilized by query parsing system 100 to generate scores for the candidate parses 414-1, 414-2, 414-3, and 414-4, as will be described with reference to FIG. 5.

FIG. 5 illustrates a trained neural network 500 that receives inputs 502 (e.g., input 502-1, input 502-2, input 502-3, and input 502-4) at an input layer, performs one or more operations on inputs 502 at any suitable number of hidden layers, and provides outputs 504 (e.g., output 504-1, output 504-2, output 504-3, and output 504-4) at an output layer.

In one example, trained neural network 500 may receive distinct vectors 506 for the candidate parses 414 as inputs 502 (e.g., distinct vector 506-1 for candidate parse 414-1 as input 502-1, distinct vector 506-2 for candidate parse 414-2 as input 502-2, distinct vector 506-3 for candidate parse 414-3 as input 502-3, and distinct vector 506-4 for candidate parse 414-4 as input 502-4).

Trained neural network 500 may generate various scores 508 for candidate parses 414 based on the corresponding distinct vectors 506 in any suitable way. For example, a score 508 may be generated based on any combination of the values within a distinct vector 506. In an example, trained neural network 500 may generate a score 508-1 of '0.8333' for vector 506-1 of candidate parse 414-1 based on the values '0,0,0,1,0,1,0.8, . . . ' of vector 506-1. As mentioned above, score 508 for a candidate parse 414 may represent a likelihood (e.g., a percentage) that the candidate parse 414 is a correct or preferred candidate parse of user input text 312, and score 508 may range from 0 to 1.

In one example, trained neural network 500 may add a weighting factor to each of the values in a vector 506. Based on the weighting factors of the values, trained neural network 500 may generate score 508 for each distinct vector 506. In certain examples, the weights applied to each of the values may vary (e.g., between distinct vectors) depending on all of the values in the distinct vector 506, and trained neural network 500 may generate different scores 508 based on the different weights. As illustrated in FIG. 5, both distinct vectors 506-1 and 506-3 include a value of '.8' in a seventh position, but distinct vectors 506-1 and 506-3 include different values in the other positions. In this example, trained neural network 500 utilizes a weighted combination of all values in distinct vectors 506 to generate scores 508, such that scores 508-1 and 508-3 from distinct vectors 506-1 and 506-3 are different as shown in FIG. 5.

Thus, based on the weighted values within each of the distinct vectors 506, trained neural network 500 may generate various scores 508 for candidate parses 414 (e.g., score 508-1 for candidate parse 414-1, score 508-2 for candidate parse 414-2, score 508-3 for candidate parse 414-3, and score 508-4 for candidate parse 414-4). These generated scores 508 may then be provided as outputs 504 from trained neural network 500. As mentioned above, the scores 508 may represent a likelihood that the corresponding candidate parse 414 is correct, and the scores 508 may range from 0 to 1.

Returning to FIG. 3, query parsing system 100 may perform one or more operations based on the scores 508 for candidate parses 414 to select a candidate what portion and a candidate where portion of a particular candidate parse 414 as search parameters. In one example, query parsing system 100 may rank candidate parses 414 based on the associated scores 508 in any suitable way, such as from highest to lowest.

Based on the ranking, query parsing system 100 may select a candidate what portion 416 and a candidate where portion 418 for any number of candidate parses 414. In one example, query parsing system 100 may select a candidate what portion 416 and a candidate where portion 418 of a highest-ranked candidate parse 414 (e.g., candidate parse 414-4) as search parameters. In another example, query parsing system 100 may select a candidate what portion 416 and a candidate where portion 418 of the top two highest-ranked candidate parses 414 (e.g., candidate parses 414-4 and 414-1) as search parameters.

Based on the search parameters selected by query parsing system 100, search engine 304 may perform one or more operations to search a data store, such as points-of-interest data store 318, and return search results 316. In one example, search engine 304 may determine a geocode address or location (e.g., latitude and longitude) for the location identified in the candidate where portion of the search parameters and search for the point-of-interest identified in the candidate what portion at or near that geocode location. In another example, if the candidate where portion includes a null value, search engine 304 may determine a geocode address for device 306 and search for the point-of-interest identified in the candidate what portion near the geocode location of device 306. In certain examples, the location of the device 306 may be determined in any suitable way, including, but not limited to, triangulation of device 306 (from communication towers) and a global positioning system (GPS) location of device 306.

As mentioned above, in certain examples, a candidate what portion and a candidate where portion for multiple candidate parses may be selected as search parameters. In such examples, search engine 304 may perform one or more operations to return search results 316 based on multiple searches, as will be described with reference to FIG. 6.

Figure 6:
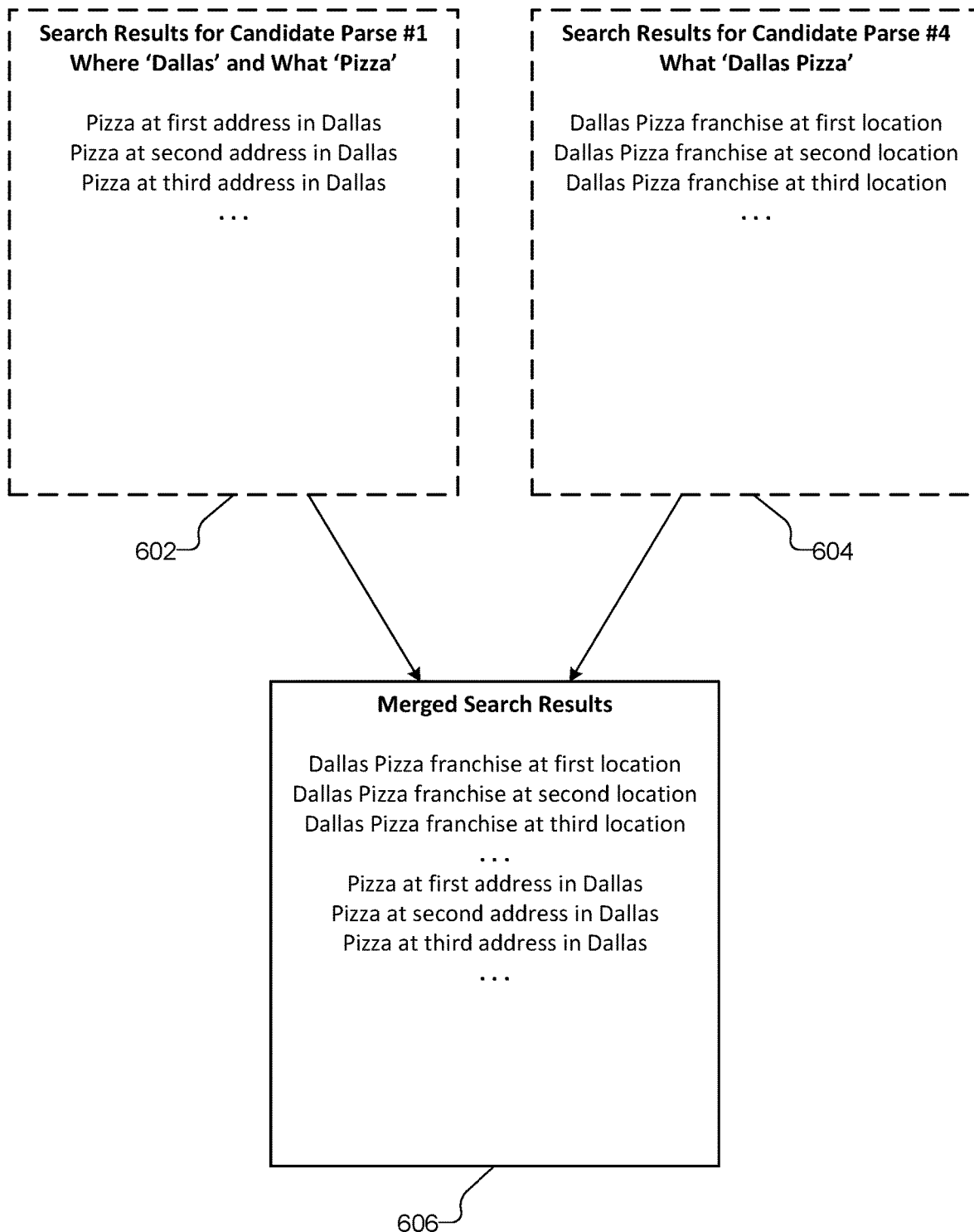
FIG. 6 illustrates exemplary search results for a search query based on selected candidate parses of user input text for the search query according to principles described herein.

As shown in FIG. 6, search engine 304 may generate multiple search results and combine the results into a merged search result. In one example, first search results 602, from a first search, may be based on a candidate what portion (e.g., Pizza) and a candidate where portion (e.g., Dallas) of a first candidate parse (e.g., candidate parse 414-1) selected as first search parameters. The first search results 602 may include multiple addresses or locations where a user may find pizza (e.g., 'pizza' being the token assigned to the candidate what portion) around Dallas (e.g., 'Dallas' being the token assigned to the candidate where portion). Similarly, second search results 604, from a second search, may be based on a candidate what portion (e.g., Dallas Pizza) and a candidate where portion (e.g., a null value) of a second candidate parse 414-4 as second search parameters. In this example, the second search results may include multiple locations of a pizza franchise named 'Dallas Pizza'. Search engine 304 may merge the first search results 602 and the second search results 604 to create merged search results 606.

As shown, FIG. 6 illustrates the search results 602, 604, and 606 as a list of addresses. However, the search results 602, 604, and 606 may be provided or displayed in any suitable format. Example formats of how the search results 602, 604, and 606 are provided or displayed may include, but are not limited to, a list of addresses, an icon or other graphical representation of the point-of-interest at specific locations of a user interface map, and a combination of the list of addresses and the graphical representation on a user interface map.

Returning to FIG. 3, search system 302 may provide search results 316 (e.g., search results from one search or merged search results 606) to device 306 via network 308. Device 306 may receive search results 316 from search system 302 and provide search results 316 to user 310 in any suitable way. For example, device 306 may include a display to present the search results on a user interface.

The examples of operations performed by query parsing system 100 to determine search parameters from a search query are illustrative and other exemplary operations may be performed without varying from the scope of the disclosure. For example, the trained neural network 500 may receive any suitable dataset in any suitable format as inputs 502. In one example, the trained neural network 500 may receive candidate parses 414 as inputs 502, process the candidate parses 414 in one or more hidden layers, and provide scores 508 for the candidate parses 414 as outputs 504. In another example, the trained neural network 500 may receive the tokens of user input text 312 as inputs 502, process the tokens in one or more hidden layers, and provide scores 508 for candidate parses 414 as outputs 504 based on the processing of the tokens. In another example, the trained neural network 500 may receive vectors 506 for candidate parses 414 as inputs 502, process the vectors 506 for the candidate parses 414 in one or more hidden layers, and provide scores 508 for the candidate parses 414 as outputs 504, such as described herein.

Figure 7:
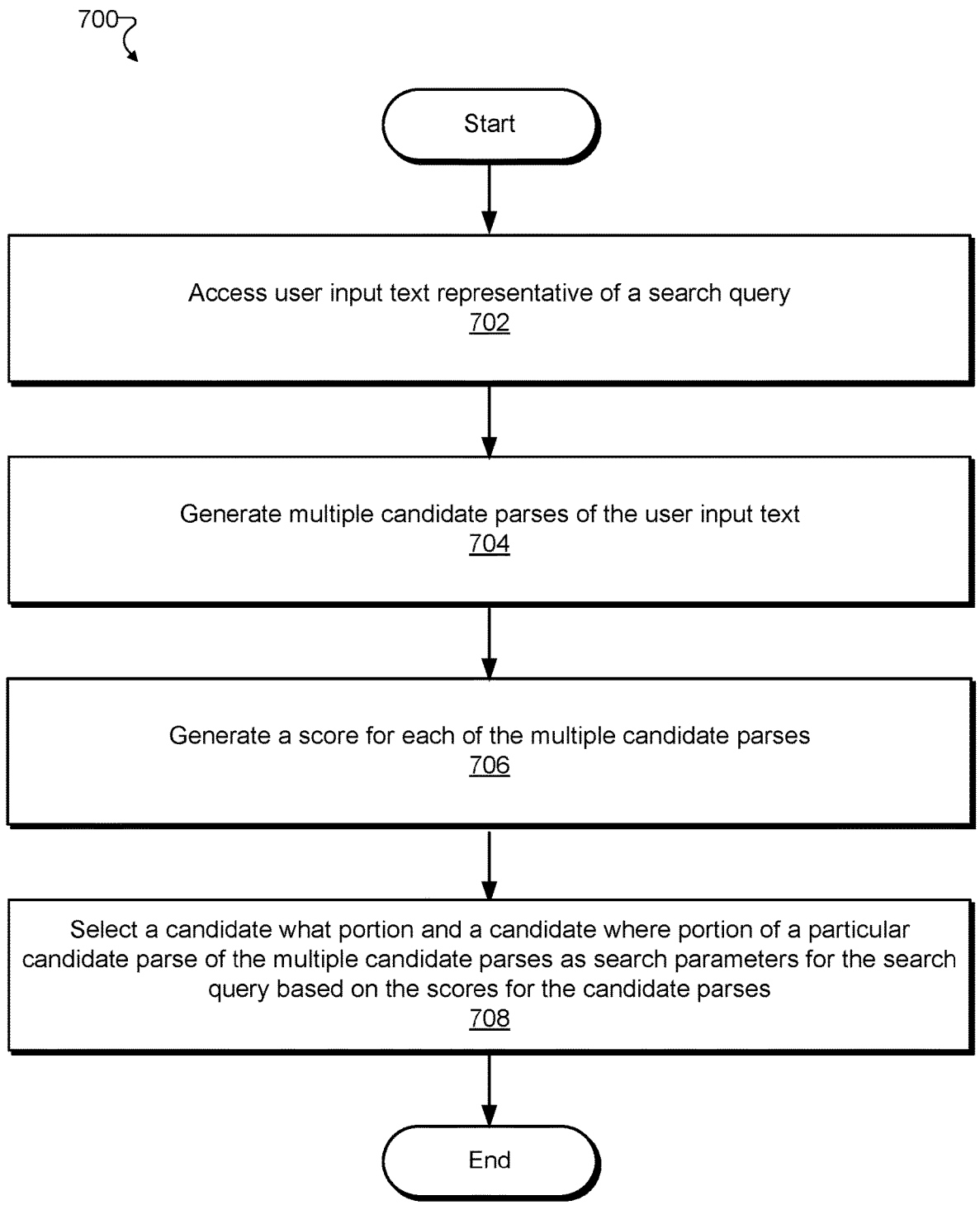
FIG. 7 illustrates an exemplary method for determining search parameters from a search query according to principles described herein.

FIG. 7 illustrates an exemplary method 700 for determining search parameters from a search query. While FIG. 7 illustrates exemplary operations according to one embodiment, other embodiments may omit, add to, reorder, and/or modify any of the operations shown in FIG. 7. One or more of the operations shown in FIG. 7 may be performed by system 100, by any components included therein, and/or by any implementation thereof.

In operation 702, user input text representative of a search query is accessed. Operation 702 may be performed in any of the ways described herein.

In operation 704, multiple candidate parses are generated for the user input text. Operation 704 may be performed in any of the ways described herein. In an example, a query parsing system may generate multiple candidate parses by creating different arrangements (e.g., between a what portion and a where portion of a candidate parse) of tokens found in the user input text, and each of the arrangements may be a different candidate parse.

In operation 706, a score for each of the multiple candidates is generated. Operation 706 may be performed in any of the ways described herein. In one example, a query parsing system may generate a score for a candidate parse based on whether one or more of a plurality of parsing features are found in the respective candidate parse. For example, the query parsing system may create a score based on a weighted combination of values (e.g., values based on parsing features) within a vector for the candidate parse.

In operation 708, a candidate what portion and a candidate where portion of a particular candidate parse of the multiple candidate parses are selected as search parameters for the search query based on the scores of the candidate parses. Operation 708 may be performed in any of the ways described herein. In an example, a query parsing system may select a candidate what portion and a candidate where portion of a particular candidate parse based on the particular candidate parse being highest-ranked (e.g., score closest to 1) of the multiple candidate parses.

In certain embodiments, one or more of the systems, components, and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a compact disc read-only memory ("CD-ROM"), a digital video disc ("DVD"), any other optical medium, random access memory ("RAM"), programmable read-only memory ("PROM"), electrically erasable programmable read-only memory ("EPROM"), FLASH-EEPROM, any other memory chip or cartridge, or any other tangible medium from which a computer may read.

Figure 8:
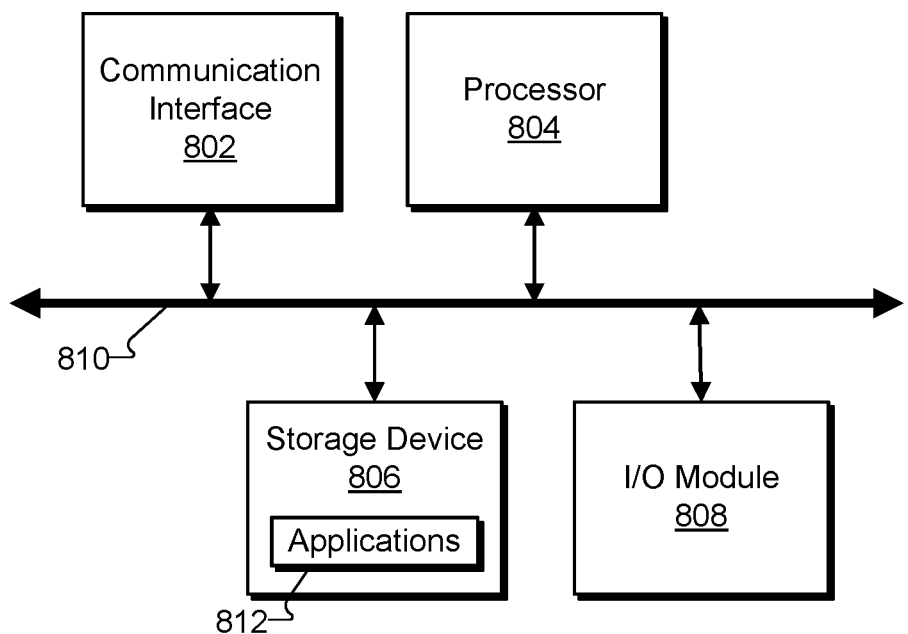
FIG. 8 illustrates an exemplary computing device according to principles described herein.

FIG. 8 illustrates an exemplary computing device 800 that may be specifically configured to perform one or more of the processes described herein. As shown in FIG. 8, computing device 800 may include a communication interface 802, a processor 804, a storage device 806, and an input/output ("I/O") module 808 communicatively connected via a communication infrastructure 810. While an exemplary computing device 800 is shown in FIG. 8, the components illustrated in FIG. 8 are not intended to be limiting. Additional or alternative components may be used in other embodiments. Components of computing device 800 shown in FIG. 8 will now be described in additional detail.

Communication interface 802 may be configured to communicate with one or more computing devices. Examples of communication interface 802 include, without limitation, a wired network interface (such as a network interface card), a wireless network interface (such as a wireless network interface card), a modem, an audio/video connection, and any other suitable interface.

Processor 804 generally represents any type or form of processing unit capable of processing data or interpreting, executing, and/or directing execution of one or more of the instructions, processes, and/or operations described herein. Processor 804 may direct execution of operations in accordance with one or more applications 812 or other computer-executable instructions such as may be stored in storage device 806 or another computer-readable medium.

Storage device 806 may include one or more data storage media, devices, or configurations and may employ any type, form, and combination of data storage media and/or device. For example, storage device 806 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 806. For example, data representative of one or more executable applications 812 configured to direct processor 804 to perform any of the operations described herein may be stored within storage device 806. In some examples, data may be arranged in one or more databases residing within storage device 806.

I/O module 808 may include one or more I/O modules configured to receive user input and provide user output. One or more I/O modules may be used to receive input for a single virtual experience. I/O module 808 may include any hardware, firmware, software, or combination thereof supportive of input and output capabilities. For example, I/O module 808 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 808 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 800. For example, one or more applications 812 residing within storage device 806 may be configured to direct processor 804 to perform one or more processes or functions associated with facilities 102 through 110 of system 100. Likewise, storage facility 112 of system 100 may be implemented by or within storage device 806.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   accessing, by a query parsing system, user input text representative of a search query;
   generating, by the query parsing system, a plurality of candidate parses of the user input text, each of the plurality of candidate parses including a candidate what portion and a candidate where portion determined from the user input text, the candidate what portion representing a point-of-interest, and the candidate where portion representing a location to search for the point-of-interest, each candidate parse in the plurality of candidate parses including a different combination of the candidate what portion and the candidate where portion;
   generating, by the query parsing system, a score for each candidate parse in the plurality of candidate parses based on whether one or more of a plurality of predefined parsing features are found in the respective candidate parse and on a machine learning model; and
   selecting, by the query parsing system from the plurality of candidate parses based on the scores for the plurality of candidate parses, the candidate what portion and the candidate where portion of a particular candidate parse included in the plurality of candidate parses as search parameters for the search query.

2. The method of claim 1, wherein:
   the machine learning model comprises a trained neural network; and
   the generating of the score for each candidate parse included in the plurality of candidate parses comprises submitting a distinct vector for each candidate parse in the plurality of candidate parses as input to the trained neural network that outputs the score for each candidate parse.

3. The method of claim 1, further comprising:
   during a training phase of the query parsing system
      accessing, by the query parsing system, a distinct test vector for each of a plurality of test candidate parses of test user input text representative of a test search query, each of the plurality of test candidate parses including a test candidate what portion and a test candidate where portion determined from the test user input text, each distinct test vector including a plurality of values, each value determined based on whether a different one of the plurality of predefined parsing features is found in the respective test candidate parse;
      accessing, by the query parsing system, an identification of a correct test candidate parse of the test user input text; and
      training, by the query parsing system, a computer scoring model based on the distinct test vector for each of the plurality of test candidate parses and the identification of the correct test candidate parse.

4. The method of claim 1, further comprising:
   searching, by a search engine within a points-of-interest data store, the selected candidate what portion and the selected candidate where portion of the particular candidate parse.

5. The method of claim 1, wherein the selecting of the candidate what portion and the candidate where portion of the particular candidate parse comprises:
   ranking the plurality of candidate parses based on the score for each candidate parse in the plurality of candidate parses, each score based on a distinct vector for each candidate parse, each distinct vector including a plurality of values, each value determined based on whether one or more of the plurality of predefined parsing features are found in the respective candidate parse; and selecting the candidate what portion and the candidate where portion of the particular candidate parse based on the particular candidate parse being a highest-ranked candidate parse in the plurality of candidate parses.

6. The method of claim 1, wherein the selecting of the candidate what portion and the candidate where portion of the particular candidate parse as the search parameters for the search query comprises:

selecting the candidate what portion and the candidate where portion of the particular candidate parse as search parameters for a first search of the search query; and wherein the method further comprises:

selecting, by the query parsing system from the plurality of candidate parses based on the scores for the plurality of candidate parses, the candidate what portion and the candidate where portion of an additional particular candidate parse included in the plurality of candidate parses as search parameters for a second search of the search query.

7. The method of claim 6, further comprising:

searching, by a search engine and within a points-of-interest data store, the selected candidate what portion and the selected candidate where portion for the particular candidate parse to generate first search results;

searching, by the search engine and within the points-of-interest data store, the selected candidate what portion and the selected candidate where portion for the additional particular candidate parse to generate second search results;

merging the first search results and the second search results to generate merged search results; and providing the merged search results for presentation in a user interface.

8. A system comprising:

at least one physical computing device configured to:

access user input text representative of a search query;

generate a plurality of candidate parses of the user input text, each of the plurality of candidate parses including a candidate what portion and a candidate where portion determined from the user input text, the candidate what portion represents a point-of-interest, and the candidate where portion represents a location to search for the point-of-interest, each candidate parse in the plurality of candidate parses including a different combination of the candidate what portion and the candidate where portion;

generate a score for each candidate parse in the plurality of candidate parses based on whether one or more of a plurality of predefined parsing features are found in the respective candidate parse and on a machine learning model; and select, from the plurality of candidate parses based on the scores for the plurality of candidate parses, the candidate what portion and the candidate where portion of a particular candidate parse included in the plurality of candidate parses as search parameters for the search query.

9. The system of claim 8, wherein:

the machine learning model comprises a trained neural network; and the generation of the score for each candidate parse included in the plurality of candidate parses comprises submitting a distinct vector for each candidate parse in the plurality of candidate parses as input to the trained neural network that outputs the score for each candidate parse.

10. The system of claim 8, wherein, during a training phase of the system, the at least one physical computing device is further configured to:

access a distinct test vector for each of a plurality of test candidate parses of test user input text representative of a test search query, each of the plurality of test candidate parses including a test candidate what portion and a test candidate where portion determined from the test user input text, each distinct test vector including a plurality of values, each value determined based on whether a different one of the plurality of predefined parsing features is found in the respective test candidate parse;

access an identification of a correct test candidate parse of the test user input text; and train a computer scoring model based on the distinct test vector for each of the plurality of test candidate parses and the identification of the correct test candidate parse.

11. The system of claim 8, further comprising at least one other physical computing device configured to:

search, within a points-of-interest data store, the selected candidate what portion and the selected candidate where portion of the particular candidate parse.

12. The system of claim 8, wherein the selection of the candidate what portion and the candidate where portion of the particular candidate parse comprises:

ranking the plurality of candidate parses based on the score for each candidate parse in the plurality of candidate parses, each score is based on a distinct vector for each candidate parse, each distinct vector including a plurality of values, each value determined based on whether one or more of the plurality of predefined parsing features are found in the respective candidate parse; and selecting the candidate what portion and the candidate where portion of the particular candidate parse based on the particular candidate parse being a highest-ranked candidate parse in the plurality of candidate parses.

13. The system of claim 8, wherein the selection of the candidate what portion and the candidate where portion of the particular candidate parse as the search parameters for the search query comprises:

selecting the candidate what portion and the candidate where portion of the particular candidate parse as search parameters for a first search of the search query; and selecting, from the plurality of candidate parses based on the scores for the plurality of candidate parses, the candidate what portion and the candidate where portion of an additional particular candidate parse included in the plurality of candidate parses as search parameters for a second search of the search query.

14. The system of claim 13, further comprising at least one other physical computing device configured to:

search, within a points-of-interest data store, the selected candidate what portion and the selected candidate where portion for the particular candidate parse to generate first search results;

search, within the points-of-interest data store, the selected candidate what portion and the selected candidate where portion for the additional particular candidate parse to generate second search results;

merge the first search results and the second search results to generate merged search results; and provide the merged search results for presentation in a user interface.

15. A non-transitory computer-readable medium storing instructions that, when executed, direct at least one processor of a computing device to:

access user input text representative of a search query;

generate a plurality of candidate parses of the user input text, each of the plurality of candidate parses including a candidate what portion and a candidate where portion determined from the user input text, the candidate what portion represents a point-of-interest, and the candidate where portion represents a location to search for the point-of-interest, each candidate parse in the plurality of candidate parses including a different combination of the candidate what portion and the candidate where portion;

generate a score for each candidate parse in the plurality of candidate parses based on whether one or more of a plurality of predefined parsing features are found in the respective candidate parse and on a machine learning model; and select, from the plurality of candidate parses based on the scores for the plurality of candidate parses, the candidate what portion and the candidate where portion of a particular candidate parse included in the plurality of candidate parses as search parameters for the search query.

16. The computer-readable medium of claim 15, wherein:

the machine learning model comprises a trained neural network; and the generation of the score for each candidate parse included in the plurality of candidate parses comprises submitting a distinct vector for each candidate parse in the plurality of candidate parses as input to the trained neural network that outputs the score for each candidate parse.

17. The computer-readable medium of claim 15, wherein, during a training phase, the instructions, when executed, direct the at least one processor of the computing device to:

access a distinct test vector for each of a plurality of test candidate parses of test user input text representative of a test search query, each of the plurality of test candidate parses including a test candidate what portion and a test candidate where portion determined from the test user input text, each distinct test vector including a plurality of values, each value determined based on whether a different one of the plurality of predefined parsing features are found in the respective test candidate parse;

access an identification of a correct test candidate parse of the test user input text; and train a computer scoring model based on the distinct test vector for each of the plurality of test candidate parses and the identification of the correct test candidate parse.

18. The computer-readable medium of claim 15, wherein the selection of the candidate what portion and the candidate where portion of the particular candidate parse comprises:

ranking the plurality of candidate parses based on the score for each candidate parse in the plurality of candidate parses, each score is based on a distinct vector for each candidate parse, each distinct vector including a plurality of values, each value determined based on whether one or more of the plurality of predefined parsing features are found in the respective candidate parse; and selecting the candidate what portion and the candidate where portion of the particular candidate parse based on the particular candidate parse being a highest-ranked candidate parse in the plurality of candidate parses.

19. The computer-readable medium of claim 15, wherein the selection of the candidate what portion and the candidate where portion of the particular candidate parse as the search parameters for the search query comprises:

selecting the candidate what portion and the candidate where portion of the particular candidate parse as search parameters for a first search of the search query; and selecting, from the plurality of candidate parses based on the scores for the plurality of candidate parses, the candidate what portion and the candidate where portion of an additional particular candidate parse included in the plurality of candidate parses as search parameters for a second search of the search query.

20. The computer-readable medium of claim 19, wherein instructions, when executed, direct at least one other processor of the computing device to:

search, within a points-of-interest data store, the selected candidate what portion and the selected candidate where portion for the particular candidate parse to generate first search results;

search, within the points-of-interest data store, the selected candidate what portion and the selected candidate where portion for the additional particular candidate parse to generate second search results;

merge the first search results and the second search results to generate merged search results; and provide the merged search results for presentation in a user interface.

21. The method of claim 1, wherein at least some candidate parses included in the plurality of candidate parses include a null value for one of the candidate what portion or the candidate where portion.

* * * * *